United States Patent [19]

Bryntse et al.

[11] 3,853,300

[45] Dec. 10, 1974

[54] VALVES FOR THE PRESSURE MEDIUM IN HYDRAULIC OR PNEUMATIC LIFTING DEVICES

[75] Inventors: Anders Ivar Bryntse, Mjolby; Karl-Erik Berkestad, Linkoping, both of Sweden

[73] Assignee: AB Bygg- Och Transportekonomi (BT), Mjolby, Sweden

[22] Filed: Sept. 25, 1973

[21] Appl. No.: 400,630

[30] Foreign Application Priority Data
Oct. 3, 1972 Sweden.............................. 12734/72

[52] U.S. Cl................................. 251/120, 251/321
[51] Int. Cl............................................. F16k 47/04
[58] Field of Search.......... 251/120, 205, 210, 321, 251/121

[56] References Cited
UNITED STATES PATENTS
2,384,977  9/1945  Swearingen........................ 251/321
FOREIGN PATENTS OR APPLICATIONS
520,187  3/1931  Germany............................ 251/120

*Primary Examiner*—Arnold Rosenthal
*Attorney, Agent, or Firm*—Young & Thompson

[57] ABSTRACT

A valve to be used in a hydraulic pallet truck comprises a valve housing, the inlet side of which is provided with a valve seat. Axially displaceable to and from this seat is a valve cone and behind the seat, where the cone is, are in the housing formed two different sized chambers axially after each other. The first one has a smaller cross section than the second one and surrounds the valve cone, when that engages the valve seat, forming between them a narrow passage for the pressure medium. The valve cone is movable from the valve seat through the first chamber and into the second chamber. When the operator moves the cone in the first chamber a flow dependent pressure fall will arise over the valve cone, which thereby is subject to a counteracting force in relation to the force which by the operator is exerted on it for its opening.

4 Claims, 1 Drawing Figure

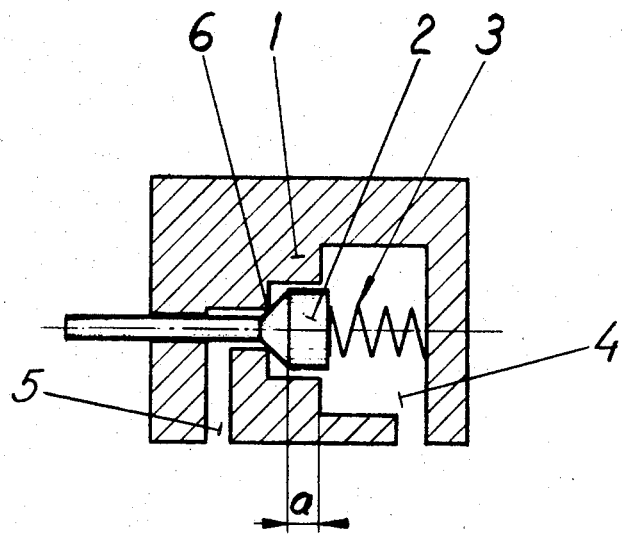

VALVES FOR THE PRESSURE MEDIUM IN HYDRAULIC OR PNEUMATIC LIFTING DEVICES

The present invention relates to a valve to be used in hydraulic or pneumatic lift devices and comprising a valve housing, the inlet side of which is provided with a valve cone axially displaceable to and from a valve seat, the valve housing on the same side being formed with a relatively large chamber cooperating with the valve cone and connected to the pressure medium inlet.

In hydraulically operated elevating pallet trucks and similar vehicles the oil flow is manually regulated, for instance when the load is lowered, through having the oil to escape from the lifting cylinder via a valve. The difficulty arises when it is wanted to accomplish a gentle regulation of the oil flow, that being necessary when handling damageable loads, glass articles, explosives and similar goods. The operation of the valve takes place by means of some sort of a handle or pedal device, the movement of which either directly or through a link system, a chain, a steel wire, a hydraulic conduit or other suitable devices is transferred to a valve cone, included in the valve device and so that the operator when regulating the valve device senses the pressure from the valve cone.

The object of the present invention is to improve the function of such a valve device considerably and to make the regulation softer.

According to the invention there is in the valve housing between the valve seat and the large chamber formed a small chamber having its inner wall cooperating with an outer surface of the valve cone in such a way that between them is formed a narrow passage for the pressure medium, said narrow passage extending from the large chamber and towards the valve seat and being maintained as long as the valve cone is between a position in which it engages the seat and a position in which it is about to leave the small chamber, the purpose of this arrangement being to obtain a flow dependent pressure fall over the valve cone, when it is between the positions mentioned, the valve cone thereby being subject to a counteracting force in relation to the force which by the operator is exerted on it for its opening.

A preferred embodiment of the invention will now be described by way of example with reference to the accompanying DRAWING which shows a longitudinal section of a device according to the invention.

In the drawing 1 is a valve housing, 2 a valve cone and 3 a return spring. 4 is the inlet for the pressure medium and 5 is its outlet. In closed position the valve cone 2 engages a seat 6.

For opening the valve the operator manually moves the valve cone 2 to the right. This cone and the valve housing 1 are according to the invention so formed that they cause a flow dependent pressure fall over the valve cone 2 generating a force acting on the right end of the valve cone and tending to mive it to its closed position. This latter force therefor counteracts the force the operator exerts on the valve cone 2 for its opening. When the flow increases the pressure fall also increases, thus constituting a self-regulating action. In the drawing $a$ designates the throttle zone in which this self-regulating action takes place. If the operator wants a rapid lowering of the load he moves the valve cone 2 to the right beyond the extension of this zone $a$.

We claim:

1. A valve comprising a housing having an inlet and an outlet and a passage between said inlet and outlet, a valve seat formed on said housing and surrounding said passage, a first cylindrical chamber of relatively small diameter on the inlet side of said valve seat, a second cylindrical chamber of relatively large diameter coaxial with said first chamber and on the inlet side of said first chamber, and a valve member reciprocable in said passage coaxially of said chambers, said valve member comprising a cone that bears against said seat in the closed position of said valve member, a valve stem reciprocable in said housing on the outlet side of said cone, said cone on the inlet side thereof terminating in a cylinder coaxial with and disposed within said first chamber in said closed position, said cylinder having the largest diameter of any portion of the valve member, said cylinder being movable out of said first chamber and entirely into said second chamber upon manipulation of said valve stem.

2. A valve as claimed in claim 1, and a coil compression spring extending axially of said second chamber and acting between a wall of said second chamber and said cylinder to urge said valve member to closed position.

3. A valve as claimed in claim 1, the greatest diameter of said cone being substantially equal to the diameter of said cylinder.

4. A valve as claimed in claim 1, said valve stem sliding in said housing and said outlet being laterally offset from the axis of said chambers.

* * * * *